US012081060B2

(12) United States Patent
Subbaraman et al.

(10) Patent No.: US 12,081,060 B2
(45) Date of Patent: Sep. 3, 2024

(54) MINIMIZING IRREVERSIBLE SWELLING DURING BATTERY CHARGING

(71) Applicant: Robert Bosch GmbH, Stuttgart (DE)

(72) Inventors: Anantharaman Subbaraman, Mountain View, CA (US); Camille Usubelli, San Jose, CA (US); Michael Metzger, Sunnyvale, CA (US); Farshad Ramezan Pour Safaei, Los Gatos, CA (US); Münir Besli, San Jose, CA (US); Nikhil Ravi, Redwood City, CA (US)

(73) Assignee: Robert Bosch GmbH (DE)

( * ) Notice: Subject to any disclaimer, the term of this patent is extended or adjusted under 35 U.S.C. 154(b) by 611 days.

(21) Appl. No.: 17/018,348

(22) Filed: Sep. 11, 2020

(65) Prior Publication Data
US 2022/0085635 A1   Mar. 17, 2022

(51) Int. Cl.
*H02J 7/00* (2006.01)
*H01M 10/44* (2006.01)

(52) U.S. Cl.
CPC ......... *H02J 7/00719* (2020.01); *H01M 10/44* (2013.01); *H02J 7/0048* (2020.01); *H02J 7/007194* (2020.01); *H01M 2220/30* (2013.01)

(58) Field of Classification Search
CPC ............. H02J 7/00719; H02J 7/0048; H02J 7/007194; H02J 7/007; H02J 7/00712; H01M 10/44; H01M 2220/30; H01M 10/0525; H01M 10/48; Y02E 60/10
USPC ........................................................ 320/132
See application file for complete search history.

(56) References Cited

U.S. PATENT DOCUMENTS

| | | | | |
|---|---|---|---|---|
| 8,368,346 B2* | 2/2013 | Batson | ................. | H02J 7/0071 320/137 |
| 8,482,262 B2* | 7/2013 | Takami | ................. | H01M 4/131 320/148 |
| 8,513,919 B2* | 8/2013 | Bhardwaj | ................. | H02J 7/04 320/152 |
| 8,523,958 B2* | 9/2013 | Min | ................. | H01M 10/0567 29/623.2 |
| 8,808,884 B2* | 8/2014 | Song | ................. | H01M 10/052 429/231.1 |

(Continued)

FOREIGN PATENT DOCUMENTS

| | | | | |
|---|---|---|---|---|
| CN | 1545162 A | * | 11/2004 | ............. Y02E 60/10 |
| CN | 101682197 A | * | 3/2010 | ............. H02J 7/0008 |

(Continued)

OTHER PUBLICATIONS

Sauerteig et al., "Electrochemical-mechanical coupled modeling and parameterization of swelling and ionic transport in lithium-ion batteries", Journal of Power Sources 378 (2018) 235-247, Germany, 3 pages.

(Continued)

*Primary Examiner* — M Baye Diao
(74) *Attorney, Agent, or Firm* — Dickinson Wright PLLC

(57) ABSTRACT

A method and system for charging a battery (e.g., including but not limited to lithium-ion batteries). The method may comprise: iteratively determining a plurality of charge profiles of the battery; based on the plurality of charge profiles, iteratively determining swelling of the battery; and adjusting a charge current during a subsequent charging of the battery.

17 Claims, 6 Drawing Sheets

(56) References Cited

U.S. PATENT DOCUMENTS

| | | | |
|---|---|---|---|
| 9,030,169 B2 | 5/2015 | Christensen et al. | |
| 9,263,900 B2 | 2/2016 | Ju et al. | |
| 10,122,193 B2* | 11/2018 | Lin | H02J 7/007192 |
| 10,243,380 B2* | 3/2019 | Jung | G01R 31/44 |
| 10,312,699 B2 | 6/2019 | Subbaraman et al. | |
| 10,424,961 B1* | 9/2019 | Maluf | H02J 7/00041 |
| 10,587,139 B2* | 3/2020 | Oh | H02J 7/007194 |
| 10,666,077 B1* | 5/2020 | Dharia | H02J 7/0071 |
| 10,809,049 B2* | 10/2020 | Ghantous | H01M 10/425 |
| 10,886,767 B2* | 1/2021 | Kim | H01M 10/484 |
| 10,938,075 B2* | 3/2021 | Fujita | H01M 10/482 |
| 11,035,905 B1* | 6/2021 | Nam | G01R 31/389 |
| 11,095,139 B2* | 8/2021 | Lundgren | H02J 7/0048 |
| 11,133,563 B2* | 9/2021 | Ju | H02J 7/00719 |
| 11,196,096 B2* | 12/2021 | Song | H01M 50/204 |
| 11,243,258 B2* | 2/2022 | Ramezan Pour Safaei | H02J 7/00712 |
| 11,552,494 B2* | 1/2023 | Kim | H01M 10/486 |
| 2008/0238361 A1* | 10/2008 | Pinnell | H02J 7/04 320/162 |
| 2010/0313410 A1* | 12/2010 | Min | H01M 10/058 29/623.2 |
| 2012/0025771 A1* | 2/2012 | Bhardwaj | H02J 7/007194 320/128 |
| 2013/0193912 A1* | 8/2013 | Bornhoft | H02J 7/00718 320/108 |
| 2013/0257382 A1* | 10/2013 | Field | H02J 7/0071 320/136 |
| 2015/0340893 A1* | 11/2015 | Lin | H02J 7/00712 320/114 |
| 2015/0380697 A1* | 12/2015 | Osborne | H01M 50/502 429/153 |
| 2016/0116548 A1 | 4/2016 | Ghantous et al. | |
| 2016/0187428 A1* | 6/2016 | Basu | G01R 31/367 702/63 |
| 2018/0017399 A1* | 1/2018 | Rolnik | G01C 21/3469 |
| 2018/0149462 A1* | 5/2018 | Ghantous | H01M 10/425 |
| 2020/0150185 A1* | 5/2020 | Ramezan Pour Safaei | H01M 10/48 |
| 2021/0013731 A1* | 1/2021 | Choe | B60L 53/00 |
| 2022/0093970 A1* | 3/2022 | Goh | H01M 50/417 |

FOREIGN PATENT DOCUMENTS

| | | | | |
|---|---|---|---|---|
| CN | 101916887 B | * | 3/2013 | B25F 5/00 |
| WO | WO-2020087161 A1 | * | 5/2020 | H01M 10/44 |

OTHER PUBLICATIONS

Christensen et al., "Stress generation and fracture in lithium insertion materials", J Solid State Electrochem (2006) 10: 293-319, DOI 10.1007/s10008-006-0095-1, Mar. 7, 2006, California, 27 pages.

Spingler et al., "Optimum fast charging of lithium-ion pouch cells based on local vol. expansion criteria", Journal of Power Sources 393 (2018) 152-160, Germany, May 12, 2018, 9 pages.

Bitzer et al., "A new method for detecting lithium plating by measuring the cell thickness", Journal of Power Sources 262 (2014) 297-302, Germany, Apr. 4, 2014, 6 pages.

* cited by examiner

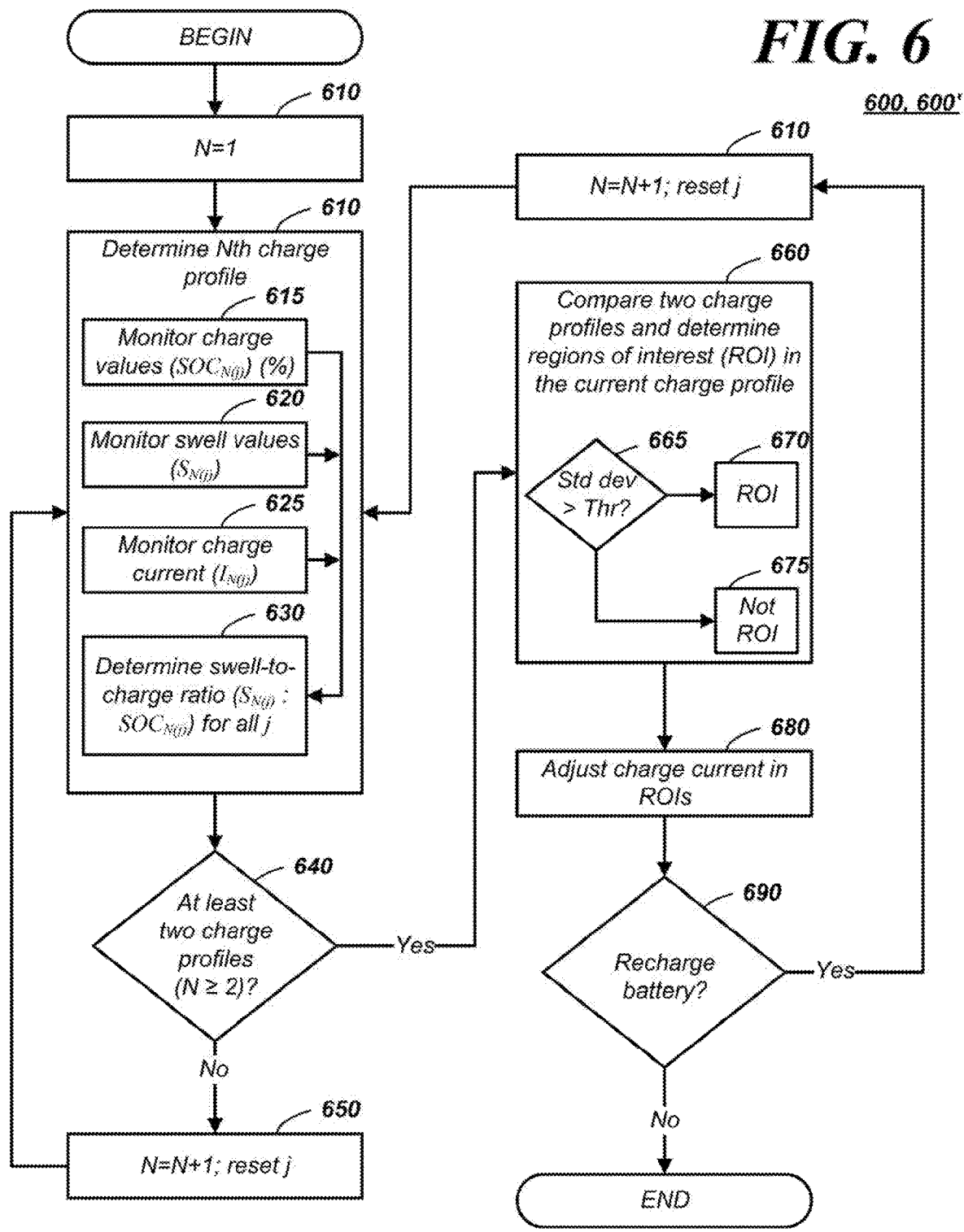

1100

MINIMIZING IRREVERSIBLE SWELLING DURING BATTERY CHARGING

TECHNICAL FIELD

The present disclosure relates to charging batteries, and more particularly, regulating charging to minimize battery swelling.

BACKGROUND

Lithium-ion batteries can be used in, among other things, electric mobility and portable electronics implementations, wherein during discharge, lithium ions move between negative and position electrodes (e.g., from anode to cathode). Lithium-ion batteries may be subject to swelling during charging and/or discharging. Some aspects of swelling may be reversible, whereas other aspects of swelling may be irreversible. Battery life may be extended if the irreversible aspect(s) can be minimized.

SUMMARY

According to one embodiment, a method is disclosed. The method may comprise: iteratively determining a plurality of charge profiles of the battery; based on the plurality of charge profiles, iteratively determining swelling of the battery; and adjusting a charge current during a subsequent charging of the battery.

According to another embodiment, a system is disclosed. The system may comprise: one or more processors; and memory coupled to the one or more processors and storing a plurality of instructions executable by the one or more processors, the plurality of instructions comprising, to: iteratively determine a plurality of charge profiles of the battery; based on the plurality of charge profiles, iteratively determine swelling of the battery; and adjust a charge current during a subsequent charging of the battery.

BRIEF DESCRIPTION OF THE DRAWINGS

FIG. 6 is a flow diagram illustrating processes of charging the lithium-ion battery to minimize swelling.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Lithium-ion batteries may experience swelling (e.g., a housing or cell wall may expand outwardly) during charging and discharging. This swelling may be reversible or irreversible. Reversible swelling may refer to swelling that subsides, whereas irreversible swelling may refer to swelling that does not subside. Once a battery has experienced a predefined amount of irreversible swelling, it may be at the end of its useful life. A battery charging method is disclosed herein that uses swelling measurements to regulate battery charging to minimize permanent degradation of the battery. This technique may be used for so-called 'fast-charging'—thereby decreasing a duration of a charging mode while minimizing battery degradation. Further disclosed is a parameterization process of a physics-based charging cycle model that is based on battery swelling measurements.

Figure 1:
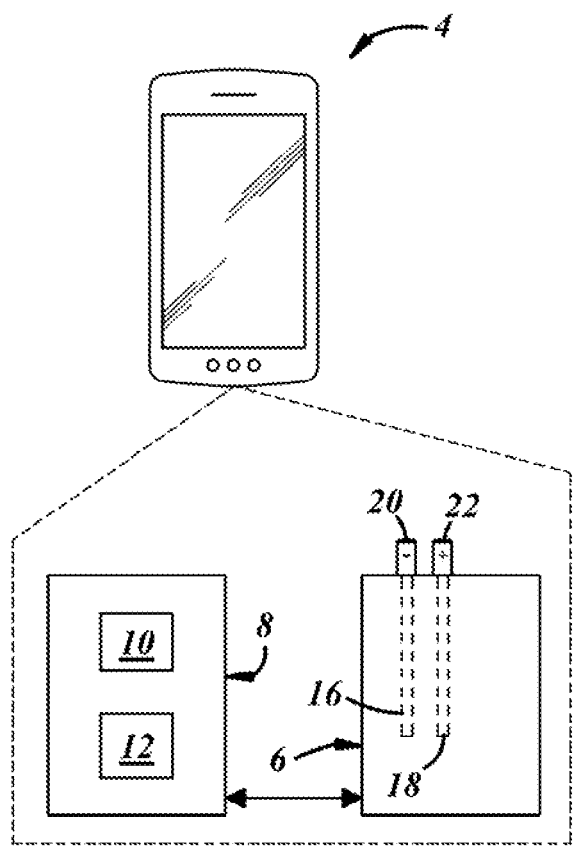
FIG. 1 is a schematic diagram illustrating a lithium-ion battery in a mobile device.

FIG. 1 illustrates a mobile device 4 carrying and using a lithium-ion battery 6 to power electronics therein, as well as a battery management system 8 comprising one or more processors 10 and memory 12, wherein the memory 12 stores data and instructions executable by the one or more processors 10 that, when executed, carry out one or more of the methods described herein. Mobile device 4 may be a mobile telephone or Smart phone and is merely an example of hardware that may utilize lithium-ion battery 6. Other electronics or electronic environments are contemplated herein.

Battery management system 8 may be any suitable device that monitors and/or controls battery charge and/or discharge—e.g., to maximize the useful life of the battery 6. The processor(s) 10 and/or memory 12 of system 8 may be a computer or other computing device. Processor(s) 10 may be programmed to process and/or execute digital instructions to carry out at least some of the tasks described herein. Non-limiting examples of processor(s) 10 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc. —just to name a few. In at least one example, processor(s) 10 read from memory 12 and/or and execute multiple sets of instructions which may be embodied as a computer program product stored on a non-transitory computer-readable storage medium (e.g., such as memory 12). Some non-limiting examples of instructions are described in the process(es) below and illustrated in the drawings. These and other instructions may be executed in any suitable sequence unless otherwise stated. The instructions and the example processes described below are merely embodiments and are not intended to be limiting.

Memory 12 may comprise volatile and/or non-volatile memory devices. Non-volatile memory devices may comprise any non-transitory computer-usable or computer-readable medium, storage device, storage article, or the like that comprises persistent memory (e.g., not volatile). Non-limiting examples of non-volatile memory devices include: read-only memory (ROM), erasable programmable read-only memory (EPROM), electrically erasable programmable read-only memory (EEPROM), optical disks, magnetic disks (e.g., such as hard disk drives, floppy disks, magnetic tape, etc.), solid-state memory (e.g., floating-gate metal-oxide semiconductor field-effect transistors (MOSFETs), flash memory (e.g., NAND flash, solid-state drives, etc.), and even some types of random-access memory (RAM) (e.g., such as ferroelectric RAM). According to one example, non-volatile memory devices may store one or more sets of instructions which may be embodied as software, firmware, or other suitable programming instructions executable by the processor(s) 10—including but not limited to the instruction examples set forth herein.

Volatile memory devices may comprise any non-transitory computer-usable or computer-readable medium, storage device, storage article, or the like that comprises nonpersistent memory (e.g., it may require power to maintain stored information). Non-limiting examples of volatile memory include: general-purpose random-access memory (RAM), static RAM (SRAM), dynamic RAM (DRAM), or the like.

Thus, battery management system 8 may be embodied as hardware and software. According to one example, system 8 may monitor real-time functions in mobile device 4. In other examples, aspects and functions of battery management system 8 may be embodied in a laboratory test fixture, as described more below.

Figure 2A:
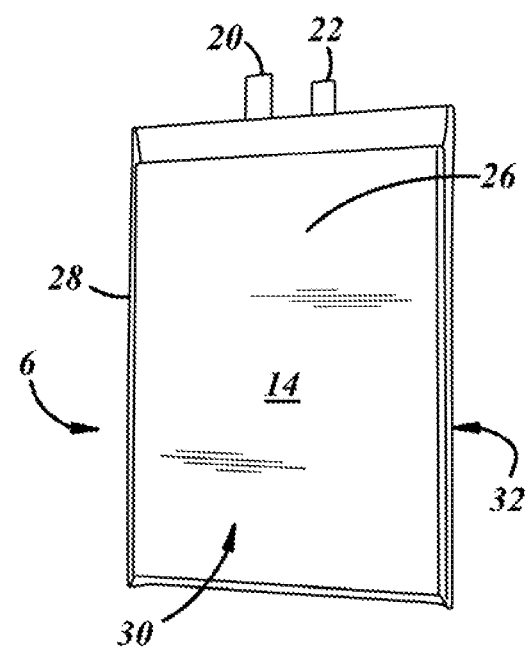
FIG. 2A is a perspective view of a pouch cell for a lithium-ion battery.
Figure 2B:
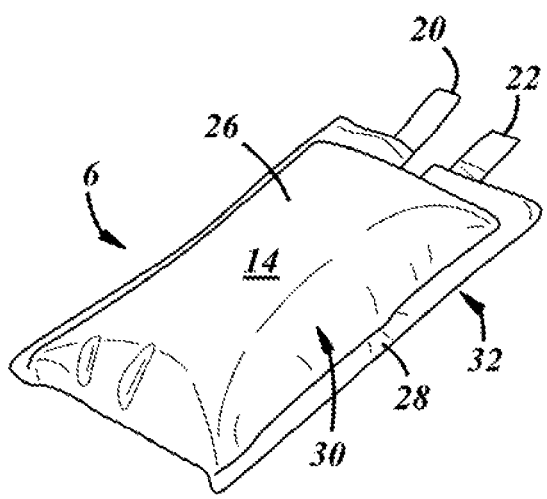
FIG. 2B is a perspective view of the pouch cell exhibiting swelling.

As shown in FIGS. 1 and 2A, lithium-ion battery 6 (the "battery") may comprise one or more cells 14, wherein each cell 14 uses lithium ions to move charge between an anode electrode 16 and a cathode electrode 18 and comprises a negative terminal 20 and a positive terminal 22 respectively coupled to corresponding electrodes 16, 18. Battery 6 may have any suitable configuration—e.g., such as one or more pouch cells, one or more prismatic cells, or one or more cylindrical cells. FIG. 2A illustrates a pouch cell 14 that typically comprises a body 26 comprising a peripheral frame 28 from which terminals 20, 22 protrude and two major sides 30, 32 (facing away from one another), wherein the sides 30, 32 can displace outwardly due to the generation of internal gases (swelling), as shown in FIG. 2B.

Figure 3A:
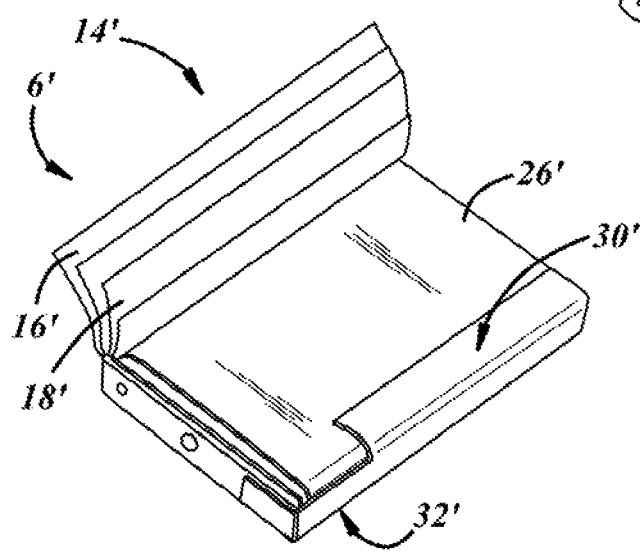
FIG. 3A is a perspective view of a prismatic cell for a lithium-ion battery wherein some layers are peeled back.
Figure 3B:
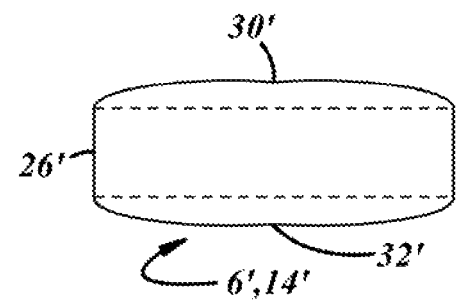
FIG. 3B is a schematic end view of the prismatic cell exhibiting swelling.

Another example of a cell is shown in FIG. 3A. E.g., a battery 6' may comprise a prismatic cell 14' comprising a body 26' typically shaped like a relatively flattened box having two major sides 30', 32'. The body 26' may comprise an anode electrode 16' and a cathode electrode 18' (shown as peeled-back layers)). FIG. 3B schematically illustrates the prismatic cell 14' exhibiting swelling.

Other examples of cells also exist. For example, a cylindrical cell (not shown) may comprise a body typically having a tube-like structure comprising concentrically-arranged cathode and anode electrodes. In the current state of the art, the bodies of pouch and prismatic cells are more subject to swelling than cylindrical cells; consequently, irreversible swelling may be minimized more in pouch and prismatic cells 14, 14'. That said, the present disclosure may be applied to any suitable type of cell including cylindrical cells and/or other cell configurations yet developed which may experience undesirable swelling.

Figure 4:
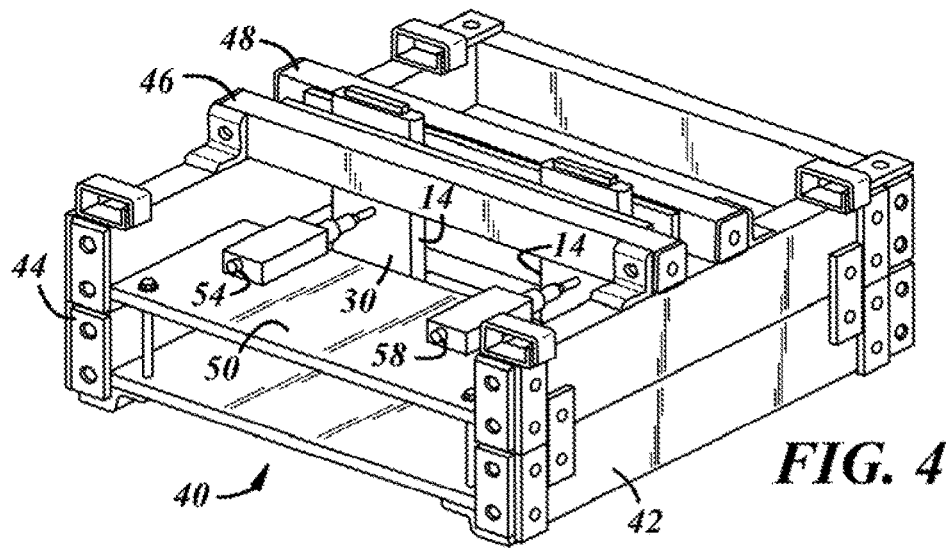
FIG. 4 is a perspective view of a battery test fixture.
Figure 5:
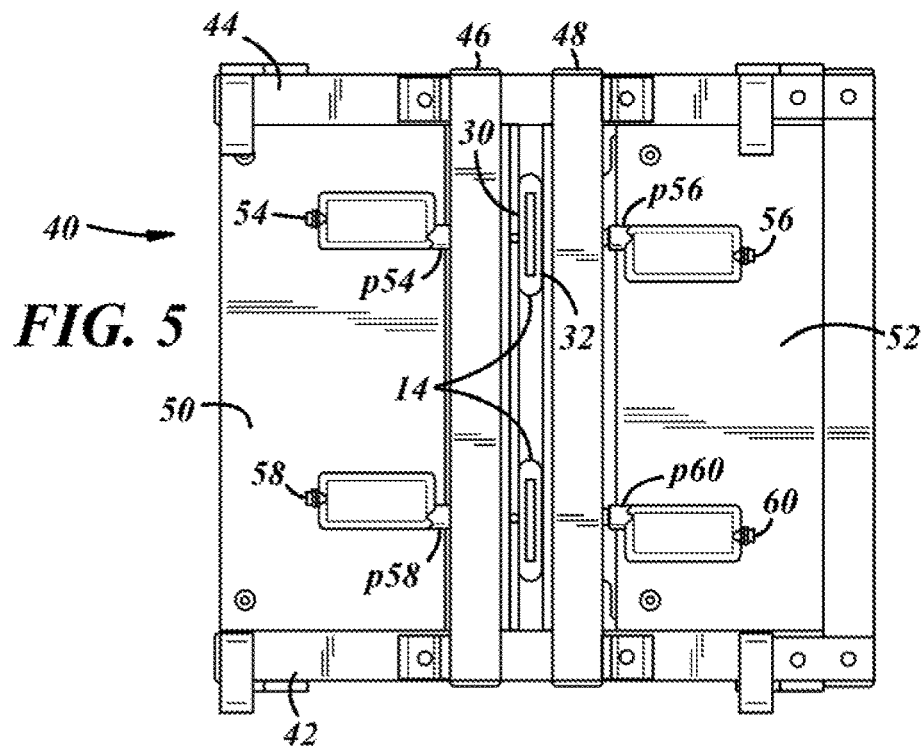
FIG. 5 is a top view of the battery test fixture shown in FIG. 4.
Figure 12:
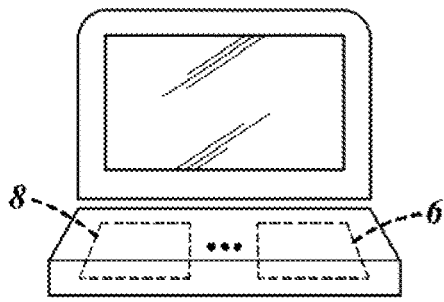
FIG. 12 is a schematic diagram illustrating a laptop computer comprising a battery management system and a lithium-ion battery.
Figure 13:
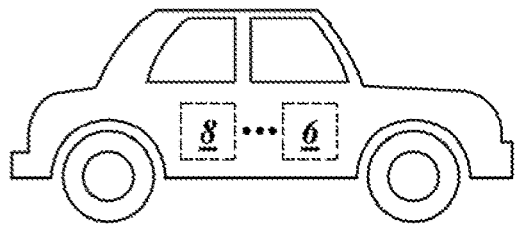
FIG. 13 is a schematic diagram illustrating a vehicle comprising a battery management system and a lithium-ion battery.

FIGS. 4-5 illustrate a test fixture 40 that may be used to demonstrate proof of operating principle, to execute at least a portion of the methods described therein, or both. Test fixture 40 may comprise a pair of supports 42, 44, one or beams 46, 48, one or more shelves 50, 52, and a plurality of sensors coupled to processor(s) 10 (here, four sensors 54, 56, 58, 60 are shown). In the arrangement, supports 42, 44 are upright plates, wherein beams 46, 48 span between supports 42, 44 and retain one or more cells 14 (e.g., such as the two pouch cells 14 shown). Here, the beams 46, 48 are coupled to supports 42, 44 and suspend the cells 14 between therebetween. Shelf 50 may support sensors 54, 58 and may span between the supports 42, 44 on one side of the beams 46, 48, whereas shelf 52 may support sensors 56, 60 and may span between the supports 42, 44 on an opposite side of the beams 46, 48. Each sensor 54-60 may be identical; therefore, only one will be described.

Sensor 54 may be any suitable sensor for detecting movement of the pouch cell 14. Non-limiting examples include a displacement sensor, a pressure sensor, or a non-contact sensor (e.g., Hall-effect sensor, laser sensor, etc.). In the illustration, each cell 14 has two displacement sensors comprising a piston (p54 p56, p58, p60, respectively) —e.g., wherein piston p54 of sensor 54 abuts major side 30 (of cell 14) and the piston of sensor 56 abuts major side 32. Pistons p58, p60 similarly may abut the major sides of the other cell 14. In this manner, sensors 54, 56 (or sensors 58, 60) may detect swell of (either) pouch cell 14. Resolution of sensors 54-60 may be as little as 1 μm.

The test fixture 40 may comprise other components (not shown) for gathering data regarding current to pouch cell 14, voltage of pouch cell 14, charging duration, etc. For instance, text fixture 40 may comprise wires (not shown) to connect to terminals 20, 22, an amp-meter (not shown), a volt-meter (not shown), a temperature sensor (attached to cell 14), and the like. According to an example, data from sensors 54-60 may be received by battery management system 8 in a laboratory setting. In other embodiments, mobile device 4 (or other suitable electronic device) may comprise sensors 54-56, a temperature sensor, an amp-meter, a volt-meter, etc. Thus, processor(s) 10 and memory 12 may be used to evaluate swell in view of other charging parameters.

FIG. 6 illustrates an illustrative process 600 for determining a charge profile that optimizes charging speed while also minimizing irreversible swelling. The process 600 may be executed using battery management system 8—e.g., the instructions being stored in memory 12 and executed by processor(s) 10. To illustrate process 600, features of the pouch cell 14 are used; however, it should be appreciated that the prismatic cell 14' or any other suitable cell may be used instead. Further, unless explicitly set forth, the instructions may be executed in any suitable order and/or at least partially concurrently. Before giving a detailed description of process 600, some aspects of physical and chemical processes related to a lithium-ion cell 14 are set forth.

Changes in volume of the body 26 of cell 14 (e.g., swelling or contraction) may occur due to a reaction within the body 26 due to the releasing of gases and/or heat which may occur during phase change of an intercalation or a deintercalation process. Thus, e.g., swelling may refer to expansion outwardly of the body 26 (or sides 30, 32). E.g., swelling may occur during charging (e.g., due to parasitic reactions due to overcharging and/or fast-charging) or during discharging (e.g., due to deep discharging). Excessive temperature, cell damage, or other factors can also contribute to swelling. In the cases of pouch and prismatic cells, the major sides 30, 32 may swell outwardly (e.g., 10-100 μm during a given charging cycle).

By way of example only, the anode electrode 16 of the pouch cell 14 may comprise graphite layers. And a majority of the expansion may occur at the anode electrode 16 as lithium ions are inserted into the graphite layers. More particularly, irreversible swelling may be due to mechanical stress (due to the expansion) and deposition of metallic lithium at the anode electrode 16 (e.g., resulting in decreased capacity for ionic transport). Further, the degree of irreversible swelling correspondingly may increase when electric current (e.g., in a charging mode) is higher (e.g., so-called fast-charging).

Process 600 may begin with block 605. In block 605, a counter value (N) may be set to one (1) —e.g., N=1. Each value of N may represent a different charge profile.

In block 610 which may follow, processor(s) 10 may determine a Nth charge profile during a charging mode and the charge profile may be a 'reference charge profile.' A charging mode may refer to a higher potential being electrically coupled to the terminals 20, 22 of cell 14 so that cell 14 may increase its electrical charge value. The charging mode may be executed during a charging cycle, wherein a charging cycle refers to an interval of time when charging is occurring, wherein the cycle terminates when charging ceases and/or discharging begins. A reference charge profile may refer to a charge profile which is used to determine a subsequent current profile (e.g., during a next charging cycle). Each charge profile may comprise a set of data that comprises charge value data and swelling value data, as illustrated by the plotted sets of data in FIG. 7 (e.g., a first set of data, a second set of data, a third set of data, etc.).

Block 610 may comprise blocks 615, 620, 625, and 630. Further, block 610 may include executing a clock (e.g., or timer) that may correspond to events during the cycle. Each will be discussed in turn.

According to one embodiment of block 610, a first Nth charge profile of block 610 may comprise relatively slow charging during the charging mode. E.g., relatively slow charging mode may refer to charging wherein the current is governed to be less than or equal to a predetermined threshold THR1—e.g., to satisfy C/10 CCCV (e.g., 1 Coulomb/10 CCCV (constant charging-constant voltage)). Further, according to an embodiment, the relatively slow charge may include a duration ($t_{REF}$) of the charging mode that is longer than a duration ($t_{CH\ MODE}$) of any subsequent charging cycles. According to this embodiment, the reference charge profile may be compared with each subsequent charge profile to determine an optimal charge profile that minimizes swelling of the cell 14. In at least this embodiment, process 600 occurs in a laboratory environment and uses test fixture 40; however, as explained in other embodiments, this is not required.

In block 615, a state of charge (SOC) value may be monitored by processor(s) 10 during block 610. E.g., as shown in Equation (1), the charge value $SOC_{N(j)}$ may be a ratio of current charge ($Q_{curr}$, in coulombs) to a maximum charge ($Q_{max}$, in coulombs), wherein $Q_{max}$ may refer to a maximum charge capacity (e.g., when the battery is nearer a beginning of its useful life). Thus, charge value may be expressed as a percentage, e.g., wherein 0-10% charge value may refer to a minimum charge (e.g., deep discharge) and 100% charge value may refer to a maximum (e.g., full) charge. Charge value (for this and other cycles) may be stored in memory 12.

$$SOC_{N(j)} = \frac{Q_{curr}}{Q_{max}}. \qquad \text{Equation (1)}$$

According to some embodiments, processor(s) 10 may determine (via a voltmeter measurement and a capacitance of the cell 14) an incremental series of charge values—e.g., between 1-100%—e.g., wherein each value (j) is a predetermined increment (e.g., such as 1%, 2%, 5%, or the like). Thus, in one example wherein the increment is 1%, values of j may be 1%, 2%, 3%, ... 100%. As will be explained more below, other values of block 610 (determining an Nth charge profile) may be correlated to each increment of charge value. E.g., as explained below, a swell value ($S_{N(j)}$) and a charge current value ($I_{N(j)}$) may be correlated to state of charge value $SOC_{N(j)}$.

In block 620, processor(s) 10—via data from sensors such as sensors 54-56 (or 58-60) —may monitor swell value ($S_{N(j)}$) during block 610. According to a non-limiting example, swell value ($S_{N(j)}$) may be stored in memory 12 for each increment of charge value $SOC_{N(j)}$—e.g., for each state of charge value $SOC_{N(1)}$, $SOC_{N(2)}$, $SOC_{N(3)}$, ..., $SOC_{N(100)}$, processor(s) 10 may store in memory 12 swell values $S_{N(1)}$, $S_{N(2)}$, $S_{N(3)}$, ..., $S_{N(100)}$.

In block 625, processor(s) 10—via an amp-meter (not shown) —may determine and/or monitor charge current values ($I_{N(j)}$) during block 610. According to a non-limiting example, charge current ($I_{N(j)}$) may be stored in memory 12 for each increment of state of charge value $SOC_{N(j)}$—e.g., for each state of charge value $SOC_{N(1)}$, $SOC_{N(2)}$, $SOC_{N(3)}$, ..., $SOC_{N(100)}$, processor(s) 10 may store in memory 12 charge current values $I_{N(1)}$, $I_{N(2)}$, $I_{N(3)}$, ..., $I_{N(100)}$.

While determining the Nth charge profile, the monitored results of blocks 615, 620, and 625 may be repeatedly provided to block 630, which may follow blocks 615, 620, 625. In block 630, processor(s) 10 may determine a swell-to-state-of-charge ratio ($S_{N(j)}/SOC_{N(j)}$). And the Nth charge profile (e.g., N=1) may be determined for all j. An example charge profile for N=1 is graphically depicted in FIG. 7 (as well as charge profiles for N=2 and N=3 and N=4, as discussed below).

Following block 610, process 600 may proceed to block 640. In block 640, processor(s) 10 may determine whether at least two charge profiles have been determined (e.g., whether N≥2). When N is not greater than or equal to two (2), then process 600 may proceed to block 650. Else process 600 may proceed to block 660.

In block 650, the value of N may be incremented (e.g., by one (1)) —e.g., so that N=1+1=2. Further, a value of j may be reset (e.g., to one (1) or otherwise according to the increment). Thereafter, process 600 may loop back to block 610 and determine a next Nth charge profile (e.g., for N=2).

Looping back to block 610, processor(s) 10 may determine swell value ($S_{N(j)}$), charge current ($I_{N(j)}$), and swell-to-state-of-charge ratio ($S_{N(j)}/SOC_{N(j)}$) for N=2; and as discussed above, FIG. 7 graphically depicts a charge profile for N=2. Continuing with the example above, the charging mode may be a predetermined duration ($t_{CH\ MODE}$) that is less than duration ($t_{REF}$)—e.g., to determine a faster charging cycle to improve user experience. Upon re-execution of block 610—in block 640—process 600 may proceed to block 660 (as repeating block 640, N now may be greater than or equal to 2).

In block 660, processor(s) 10 may compare two charge profiles (e.g., a charge profile associated with N=1 (e.g., a first charge profile) and charge profile associated with N=2 (e.g., a second charge profile)) and identify one or more regions of interest $70_N$ in the swell-to-state-of-charge ratios ($S_{N(j)}/SOC_{N(j)}$) (of N=1 and N=2) by comparing the reference charge profile (e.g., N=1) with a immediately-previous charge profile (e.g., N=2). E.g., processor(s) 10 may identify a region of the swell-to-state-of-charge ratios ($S_{N(j)}/SOC_{N(j)}$) for all j that represents a significant deviation—e.g., as deration of the current in such regions of interest may be directly related to an opportunity to minimize swelling in subsequent charging cycles.

FIG. 6 illustrates that block 660 may comprise blocks 665, 670, and 675. According to an embodiment shown in block 665, region(s) of interest $70_N$ may be determined using a standard deviation technique. For example, a standard deviation ($\sigma$) may be calculated for differences of $S_{1(j)}/SOC_{1(j)}$ and $S_{2(j)}/SOC_{2(j)}$) for all j.

Process 600 may proceed from block 665 to block 670 when the standard deviation ($\sigma$) is greater than a threshold THR2 (determining a region of interest $70_N$ (e.g., for N=2)). Conversely, when the standard deviation ($\sigma$) is not greater than threshold THR, then process 600 may proceed from block 665 to block 675 (not determining a region of interest $70_N$).

Block 680 may follow. In block 680, processor(s) 10 may adjust charge current in the region of interest $70_N$ (for N=2) for a subsequent charge profile (e.g., for N=3—i.e., a charge profile subsequent to the current charge profile)). Adjusting the charge current during the region of interest may comprise reducing and/or increasing the charge current throughout the charging cycle. E.g., current may be reduced—e.g., in regions of interest $70_N$—when the process 600 proceeds via block 670; e.g., and similarly, in some examples, current could be increased when the process 600 proceeds via block 675. According to an embodiment, this adjustment of current may be determined according to Equation (2), wherein a control loop is executed by processor(s) 10 to determine a desired current profile.

$$I_k(soc)=F(I_{k-1}(soc),T,S_{k-1}(soc);S_{ref}(soc)),\ \text{wherein}$$
$I_k(soc)$ represents the charge current for a next subsequent charging cycle k according to a function F, wherein T represents temperature of the cell 14, wherein $S_{k-1}(soc)$ represents a thickness of cell 14 (e.g., due to swelling) in the charging cycle just executed, and wherein $S_{ref}(soc)$ represents a thickness of cell 14 (e.g., due to swelling) in the reference charging cycle. Equation (2).

Accordingly, using the two thicknesses [$S_{k-1}(soc)$ and $S_{ref}(soc)$], a degree of swelling may be determined. And the current relative to the state of charge (SOC) may be controlled.

Equation (3) illustrates another embodiment of block 680 adjusting current in a next subsequent charging cycle. Equation (3) may account for aging of the cell 14 at different increments in the life of the cell 14. E.g., as explained below, prior to executing process 600, a predetermined quantity n of different ages of the cell 14 may be determined, wherein each of these ages may correspond to a threshold percent reduction is cell capacity (e.g., THR3=2% or the like).

$$I_k(soc)=F(I_{k-1}(soc),T,S_{k-1}(soc);S_{ref}^M(soc)),\ \text{wherein}$$
$I_k(soc)$ represents the charge current for a next subsequent charging cycle k according to a function F, wherein T represents temperature of the cell 14, wherein $S_{k-1}(soc)$ represents a thickness of cell 14 (e.g., due to swelling) in the charging cycle just executed, wherein $S_{ref}^M(soc)$ represents a thickness of cell 14 (e.g., due to swelling) in the reference charging cycle, wherein M is a largest $m \le k, m \in \{1,\ldots,n\}$. Equation (3).

Equation (4) illustrates a calculation that implements function F in Equation (3), wherein a proportional gain $K_T$ is temperature dependent and also achieves a target charge duration (e.g., duration ($t_{CH\ MODE}$)) in cycle k.

$$I_k(soc)=I_{k-1}(soc)+K_T*(S_{k-1}(soc)-S_{ref}^M(soc))$$

In block 690 which may follow, processor(s) 10 may determine to recharge the battery 6 again—e.g., after a discharging cycle. In at least one example, block 690 may record reversible swelling—e.g., in this manner, processor(s) 10 may determine whether irreversible swelling has been minimized. Ideally, irreversible swelling may be zero; however, according to an embodiment, irreversible swelling less than a predetermined threshold (THR4) may be considered to be optimized. According to one example, irreversible swelling may be minimized when no region of interest $70_N$ was determined in block 660. According to an example, the block 690 determines whether an optimization of the charging mode has occurred. Processor(s) 10 may determine to loop back to block 610 (via block 695) when irreversible swelling is not yet optimized, or alternatively, processor(s) 10 may determine to end process 600 (e.g., when irreversible swelling is optimized).

When process 600 does not end—but instead loops back, block 695 may follow. Block 695 may be similar or identical to block 650; therefore, for sake of brevity, this block will not be described again.

Following block 695, block 610 may be repeated—e.g., according to a charging mode having a duration ($t_{CH\ MODE}$) (e.g., N=3). The blocks described above may repeat—e.g., block 610 followed by blocks 660 and blocks 680, 690, and 695. In repeating block 680, the two charge profiles that may be compared may be those associated with N=1 (a first charge profile) and N=3 (a third charge profile). In later loop-backs, processor(s) 10 may compare N=1 to N=4, N=1 to N=5, etc. Ultimately, the ratio of swell-to-state-of-charge may be smoothed (e.g., the curve may be smoothed—indicating less irreversible swelling).

Figure 8:
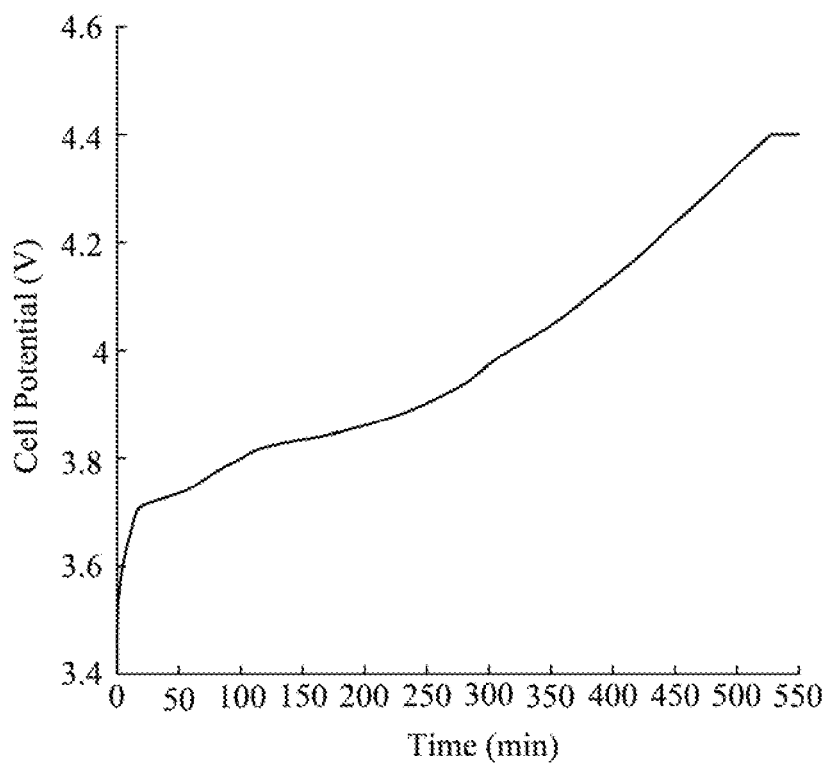
FIG. 8 is a graphical depiction of a potential vs. time profile of a cell of a lithium-ion battery.
Figure 9:
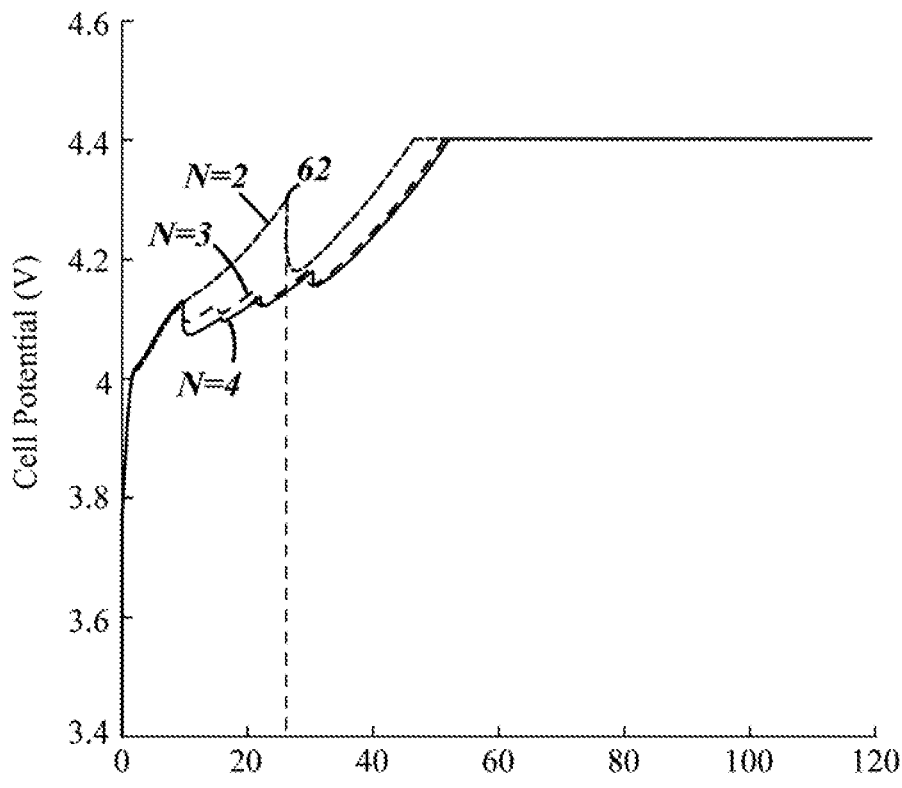
FIG. 9 is a graphical depiction of a plurality of potential vs. time profiles of the cell of FIG. 8.
Figure 10:
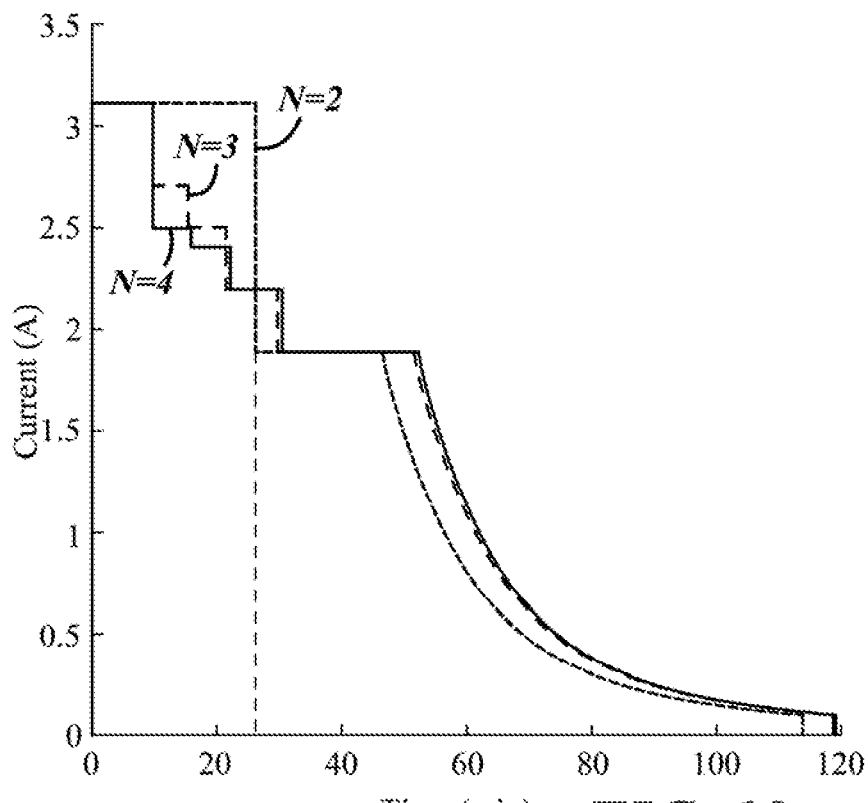
FIG. 10 is a graphical depiction of a plurality of current vs. time profiles corresponding with the plurality of potential vs. time profiles of FIG. 9.

Before discussing other embodiments of process 600, FIGS. 8-10 are described. FIG. 8 illustrates a potential profile (e.g., voltage vs. time) for the charging cycle associated with N=1. E.g., duration ($t_{REF}$) may be approximately 550 minutes long, wherein during this duration, potential of cell 14 may increase from approximately 3.5 V to 4.4 V.

Figure 7:
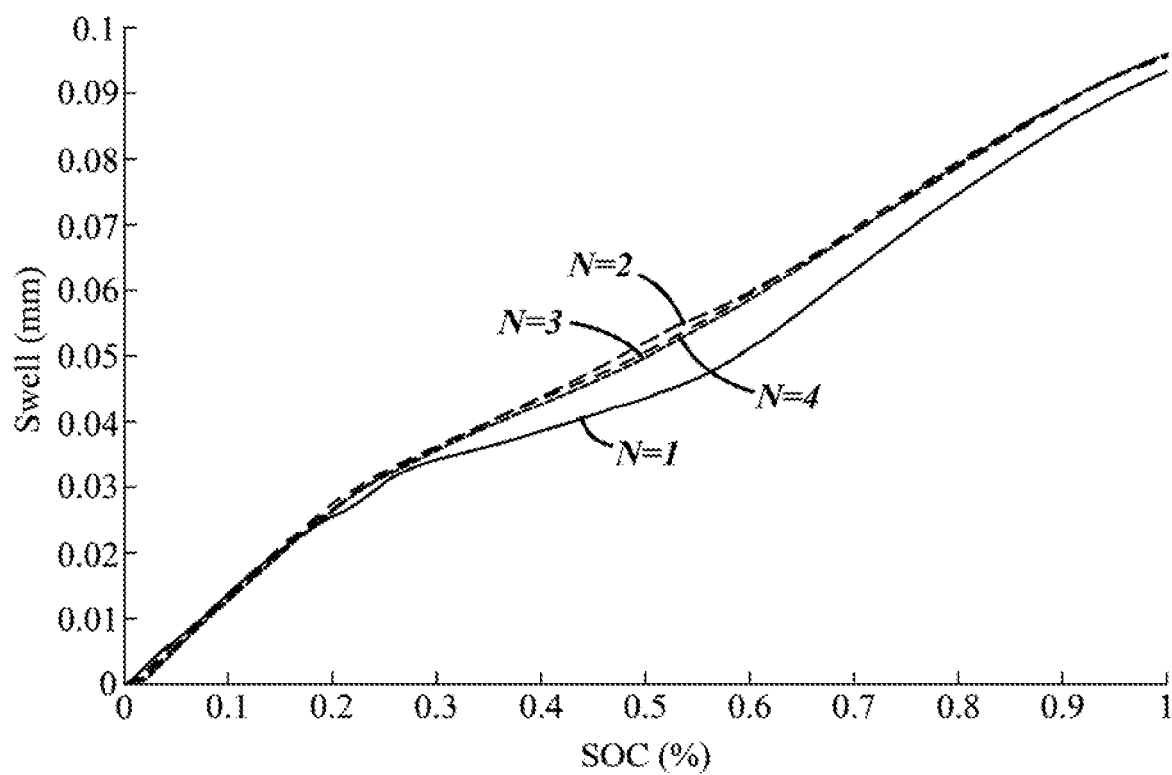
FIG. 7 is a graphical depiction of a plurality of charge profiles illustrating swell value vs. state of charge.

FIGS. 9-10 depict a potential profile (e.g., voltage vs. time) and a current profile (e.g., current vs. time), respectively for N=2, N=3, and N=4, as described below. Here, FIGS. 9-10 illustrate duration ($t_{CH\ MODE}$) as 0 to approximately 120 minutes as cell 14 charges from approximately 3.7 V to 4.4 V; however, this is merely an example. Further, FIG. 9 illustrates a voltage spike 62 at a time (e.g., ~24 minutes) which may occur when charge current changes (as shown in FIG. 10), wherein the charge current is changed in response to a deviation in dynamic swelling with regard to a reference protocol or a previous charge cycle (e.g., as shown in FIG. 7). Equations (2), (3), and/or (4) above may be used to smooth such deviations resulting in less irreversible swelling.

[0113] Other embodiments of the process also exist. For example, according to a process 600' (also FIG. 6), similar blocks may be executed (such as those shown in FIG. 6); however, each of the charging cycles may have a common duration (e.g., each have duration $t_{CH\_MODE}$) and a new reference charging cycle may be used each time block 660 is repeated. A common duration may refer to a duration that is within a threshold duration of one another (e.g., 3%, 5%, etc.). In process 600', instead of comparing each subsequent charging cycle (N=2, N=3, etc.) to a single reference charging cycle (e.g., N=1), processor(s) 10 compare each subsequent charging cycle to a charging cycle immediately previously—and the immediately-previous charging cycle may be the reference charging cycle. E.g., a charging cycle (associated with N=2) may be compared in block 660 with a charging cycle (associated with N=1), and a charging cycle (associated with N=3) may be compared in block 660 with a charging cycle (associated with N=2), etc. Accordingly, Equations (2), (3), and (4) may be applied similarly as discussed above except that $S_{ref}(soc)$ or $S_{ref}^{M}(soc)$ may refer to the immediately-previous charging cycle (e.g., instead of only N=1).

According to at least one additional embodiment, process 600 is first executed (e.g., in a laboratory environment) to determine a suitable initial charge profile to be programmed into battery management system 8. Thereafter, battery 6 is installed in a device (e.g., such as mobile device 4) and is coupled to battery management system 8 (also in mobile device 4). Then, process 600' is used in mobile device 4—e.g., outside of the laboratory environment. In this example, a subsequent charge profiles are determined using the initial charge profile (e.g., which may be the optimized charge profile determined using blocks 605-695 of blocks 600) —e.g., to prolong the useful life of battery 6.

Figure 11:
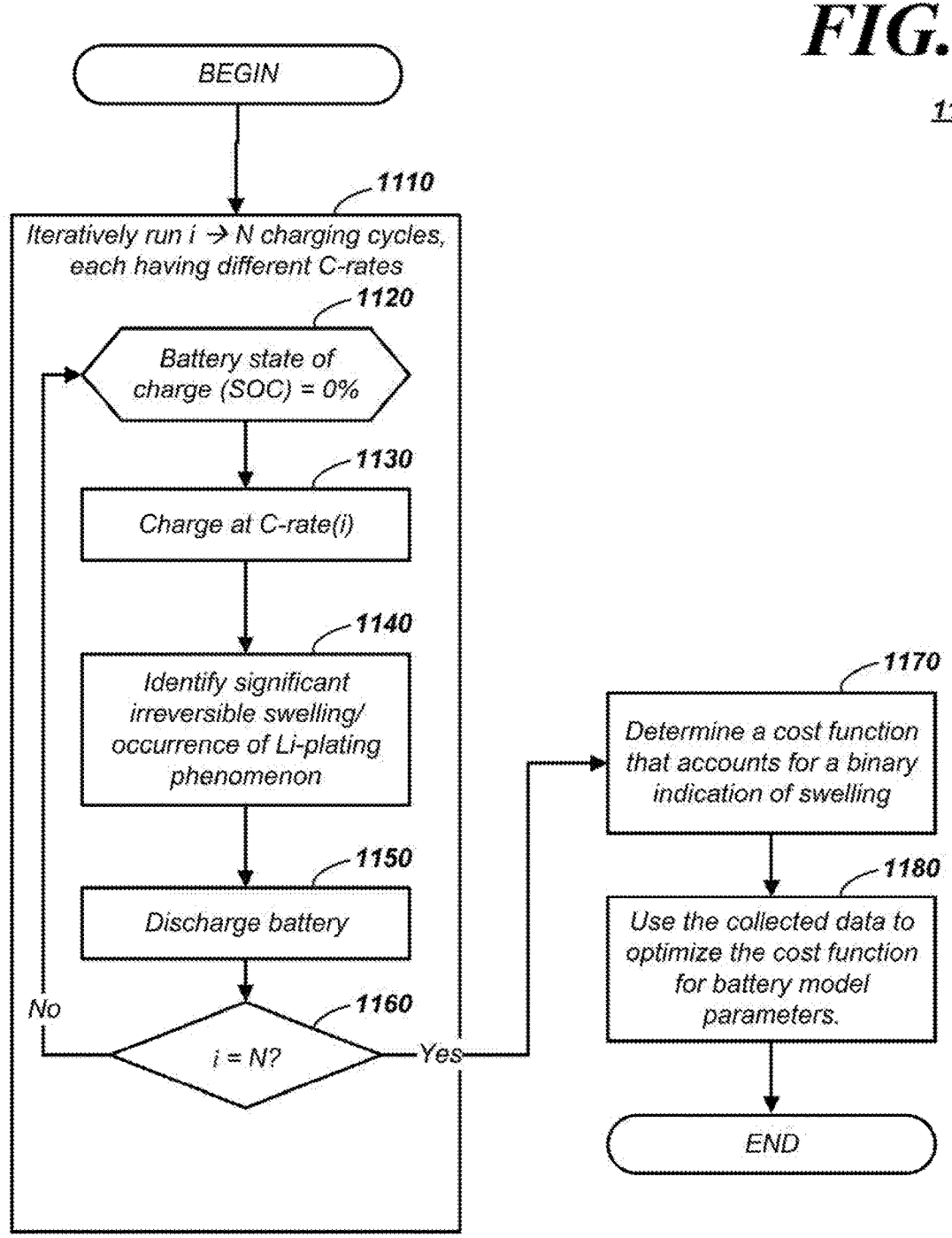
FIG. 11 is a flow diagram illustrating a parameterization process of a physics-based charging cycle model.

According another embodiment, a process 1100 of parameterization may be executed using processor(s) 10; an example is shown in FIG. 11. Parameterization may refer to identifying one or more parameters for model equations for battery 6. According to an example, parameterization may: (a) match voltage behavior of an experimental charging cycle with a physics-based charging cycle model (e.g., a computer simulation); and (b) match Li-plating trends during an experimental charging cycle with swelling measurements (e.g., an indicator of Li-plating). Herein, a physics-based charging cycle model may refer to a model having states that indicate when Li-plating occurs. According to an example, process 1100 may occur in a laboratory environment—e.g., executing a few charging cycles, acquiring data therefrom, and then fitting parameter(s) of the model.

Process 1100 may begin with block 1110—which may comprise blocks 1120, 1130, 1140, 1150, and 1160. In block 1110, processor(s) 10 may iteratively and incrementally run i→N charging cycles, wherein each charging cycle has a different C-rate, wherein each of the different C-rates is a measure of a rate at which the battery is charged relative to its maximum capacity.

Block 1120 indicates that the state of charge (SOC) of cell 14 of battery 6 is 0%. In block 1130, the cell 14 is charged at a unique C-rate. In block 1140, processor(s) 10 may store in memory 12 (during charging) cycle parameter data used to parameterize the model such as voltage data, time data, swelling data, etc.; further, the processor(s) 10 may store electrochemical battery parameters such as a diffusion coefficient of the anode material, a diffusion coefficient of the cathode material, reaction rate constants, film resistances of the battery materials, etc. Block 1150 may comprise discharging the battery 6. And in block 1160 which may follow, processor(s) 10 may determine whether an index i is equal to N iterations of charging and discharging. When it is not, process 1100 loops back and repeats block 1110. When i=N, then process 1100 proceeds to block 1170. In block 1170, processor(s) 10 may determine a cost function that accounts for (e.g., corresponds with) a binary indication of swelling. And in block 1180, processor(s) 10 may use the collected data of 1110 (e.g., including the cycle parameter data) to optimize the cost function for the battery model parameters (e.g., for the electrochemical battery parameters). A mathematical embodiment of a physics-based model (and process 1100) is described below.

Equation (5) illustrates a cost function calculation that accounts for the physics-based model, as well as the experiment data.

$$p^* = \underset{p \in P}{\operatorname{argmin}} \sum_{i=1}^{N} J_i(y_{model,i}, y_{exp,i}), \text{ s.t.} \qquad \text{Equation (Set) (5)}$$

$$\dot{x}_i(t) = f(x_i(t), z_i(t), u(t), p),$$

$$0 = g(x_i(t), z_i(t), u(t), p),$$

$$y_{model,i}(t) = h(x_i(t), z_i(t), u(t), p), \text{ and}$$

$$x_i(0) = X_i(y_{exp,i}(0), p).$$

In Equation (Set) (5), $J_i$ is a cost function, x and z refer to differential and algebraic states of the model, $f$ (e.g., a differential equation), g (e.g., an algebraic equation), h (e.g., an output equation) are each vectors and refer to functions that form an electrochemical structure of an electrochemical battery model p, i refers to the experiment number, wherein N refers to a total quantity of experiments—each having different C-rates according to a CCCV protocol, $x_i$ refers to an initial condition of an $i^{th}$ experimental charging cycle, p* refers to a result of the optimization of the model, wherein a set P may define an upper limit and a lower limit for parameter variation. The functions $f$, g, h may be derived using model order reduction techniques from the physics-based Li-ion battery model which consists of coupled partial differential equations with algebraic constraints; a non-limiting example of such a physics-based model can be found in U.S. application Ser. No. 12/396,918 which is incorporated by reference herein in its entirety.

The objective of equation set (5) is to find the best set of parameters of the electrochemical battery model p such that the difference between the battery model prediction and the experimental measurement is minimized. The cost to minimize is captured through the function $J_i$. The overall cost is the sum of individual cost of each experiment. The cost function can represent the deviation between the model prediction and the measurement. For example, the deviation in measured vs predicted voltage, or the deviation in measured vs predicted temperature. By optimizing over the set of parameters, it is possible to minimize the deviation error between the model signals and measurement signals. The constraints of the optimization problem is such that the battery model output $y_{model}$ is generated through a set of mathematical equations that define the battery operations and for some initial condition $x_i(0)$. The battery model equations are then represented by the differential algebraic equations with functions $f$, g.

Battery electrochemical model parameters that are fitted and part of the parameter vector p can include the following: a diffusion coefficient, a film resistance, an activation energy for diffusion and/or kinetics, a reaction rate constant (e.g., corresponding to anode material and/or a cathode material), a volume fraction of active material (e.g., in an anode electrolyte and/or a cathode electrolyte), Bruggeman's coefficients (e.g., an anode separator and/or a cathode/separator), electrolyte transport properties (e.g., such as diffusion coefficients and/or transference numbers), a contact resistance, and thermal model properties (e.g., such as heat capacity, heat transfer coefficients, etc.). Some functional forms related to electrolyte ionic conductivity and electrical conductivity constants in anode and/or cathode typically may be fixed during the parameterization process. The battery parameters listed above then affect the electrical behavior (e.g., such as voltage response) and temperature behavior of the battery model.

A non-limiting set of C-rates that may be used include 1C-4C.

When executed by processor(s) 10, an output ($y_{model}$) of the physics-based model may be defined by Equation (6) and an output ($y_{exp}$) of the experiment may be defined by Equation (7). For sake of simplicity, experiment number i is hidden in the equations that follow. Nevertheless, the relevant equations below may be incremented N times.

$y_{model} = [V_{model}, T_{model}]$, wherein $V_{model}$ is a voltage function of the model during a charging cycle, wherein $T_{model}$ is a temperature function of the model during the charging cycle. Equation (6).

$y_{exp} = [V_{exp}, T_{exp}]$, wherein $V_{exp}$ is a voltage function of the experiment during a charging cycle, wherein $T_{exp}$ is a temperature function of the experiment during the charging cycle. Equation (7).

A structure of the cost function (J) is illustrated by Equation (8).

$J = w_1 |V_{model} - V_{exp}|_2 + w_2 |T_{model} - T_{exp}|_2$, wherein $w_1$ and $w_2$ are predetermined weights. Equation (8).

One trend during incremental charging may include a change in crystal structure of the Li-plating. To account for such a factor, Equation (8) may be modified in accordance with Equation (9).

$J = w_1 |V_{model} - V_{exp}|_2 + w_2 |T_{model} - T_{exp}|_2 + w_3 |\mu(x,z) - \alpha_{exp}|$, wherein $w_1, w_2$, and $w_3$ are predetermined weights, wherein $\alpha_{exp} = 1$, for the respective experimental charging cycle when swelling is observed, wherein $\alpha_{exp} = 0$, when no swelling is observed, wherein a function $\mu(x,z)$ which has a binary output (0 or 1) depending on a state of the model. The weights $w_1, w_2, w_3$ can be chosen to normalize the different error functions in the cost function. For example, $w_3 = 1$ would normalize the plating error prediction, $w_1, w_2$ can be based on the target RMS error for the voltage, temperature dynamics. Equation (9).

With regard to $\mu(x,z)$, $\mu(x,z) = 1$, if $z_k < 0$ at some time during charge, wherein $z_k$ refers to a $k^{th}$ element of the model/vector z; otherwise, $\mu(x,z) = 0$.

A quality of the electrochemical model parameters may be improved by minimizing a voltage error between the model and the experiment while also monitoring trends in internal states (e.g., such as anode overpotential), Li-plating observed from swelling experiments, and the like. Minimizing voltage error and/or avoiding anode overpotential can be an advantage in the areas of fast charging and power prediction. Model based fast charging strategies typically rely on controlling the anode overpotential during charging above a 0 mV limit. Consequently, a better estimate of anode overpotential from improved model parameterization can lead to fast charging protocols that achieve a target charging time while minimizing battery aging. Similarly, for estimating how much power can be recuperated during braking events and used for charging battery, an estimate of anode overpotential is necessary to prevent triggering of harmful side reactions like Li-plating.

By using the model set forth in Equations (5)-(7) and (9), processor(s) 10 may partially validate an internal state of the model by detecting features that indicate undesirable side reactions (e.g., irreversible swelling due to Li-plating). By identifying irreversible swelling in a model, charging profiles which minimize irreversible plating may be determined in a computational laboratory environment. Further, it should be appreciated that developing and using the aforementioned model, battery management system 8 may better estimate state of charge (SOC) and state of health (SOH).

In at least one embodiment, the model is developed in a laboratory setting and then later programmed into processor(s) 10 (of battery management system 8) in order to regulate charging during the cell's useful life.

Thus, there has been described techniques for charging Li-ion batteries while minimizing irreversible swelling. Further, a parameterization model has been described that facilitates determining charging profiles which minimize irreversible swelling.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of charging a battery, comprising:
   iteratively determining a plurality of charge profiles of the battery;
   based on the plurality of charge profiles indicating a set of data that includes charge value data and swelling value data, iteratively determining swelling of the battery, wherein iteratively determining a plurality of charge profiles includes (1) determining a first charge profile of the battery; and (2) after a discharge of the battery, determining a second charge profile of the battery;
   determining a first region of interest by comparing the first and second charge profiles;
   adjusting a charge current in the first region of interest during the subsequent charging of the battery, wherein each of the first and second charge profiles define a relationship between a state of charge and a swelling of the battery; and
   adjusting the charge current during a subsequent charging of the battery.

2. The method of claim 1, wherein the first charge profile is defined by the first set of data comprising charge value data and swelling value data, wherein the subsequent charge profile is defined by a second set of data comprising charge value data and swelling value data.

3. The method of claim 2, wherein the first region of interest is determined by comparing swelling value data of the first and second sets of data to charge value data of the first set of data that corresponds to charge value data of the second set of data.

4. The method of claim 2, wherein the first region of interest is determined based on swelling value data of the first set of data deviating more than a threshold from swelling value data of the second set of data at corresponding charge value data of the first and second sets.

5. The method of claim 1, wherein adjusting further comprises calculating a reduction of the charge current for the subsequent charging of the battery within the first region of interest; and providing a reduced charge current based on the calculated reduction.

6. The method of claim 1, wherein the first charge profile is a predetermined slow-charging profile, wherein the second charge profile is a predetermined faster-charging profile.

7. The method of claim 6, wherein the faster-charging profile is 4-5 times faster than the slow-charging profile.

8. The method of claim 1, wherein a duration of the first and second charge profiles have a common duration with respect to one another.

9. The method of claim 1, further comprising: using the adjusted charge current, determining a third charge profile of the battery; determining a second region of interest by comparing the first and third charge profiles; and adjusting a charge current in the second region of interest while charging the battery following the third charge profile.

10. The method of claim 9, further comprising: iteratively determining additional charge profiles of the battery; iteratively and correspondingly determining additional regions of interest; adjusting a charge current in the additional regions of interest during respective subsequent charging; and when the additional regions of interest are less than a threshold, then storing a final charge profile.

11. The method of claim 1, further comprising:
   using the adjusted charge current, determining a third charge profile of the battery; determining a second region of interest by comparing the second and third charge profiles; and adjusting a charge current in the second region of interest while charging the battery following the third charge profile.

12. The method of claim 11, further comprising: iteratively determining additional charge profiles of the battery; iteratively and correspondingly determining additional regions of interest; adjusting a charge current in the additional regions of interest during respective subsequent charging; and when the additional regions of interest are less than a threshold, then storing a final charge profile.

13. The method of claim 1, wherein the battery comprises a pouch cell or a prismatic cell.

14. The method of claim 1, wherein the battery is a lithium-ion battery.

15. A system, comprising:
   one or more processors; and
   memory coupled to the one or more processors and storing a plurality of instructions executable by the one or more processors, the plurality of instructions comprising, to:
   iteratively determine a plurality of charge profiles of a battery, wherein the charge profiles indicate a set of data that includes charge value data and swelling value data, wherein iteratively determining the plurality of charge profiles includes (1) determining a first charge profile of the battery, and (2) after a discharge of the battery, determining a second charge profile of the battery;
   based on the plurality of charge profiles, iteratively determine swelling of the battery;
   determine a first region of interest by comparing the first and second charge profiles;
   adjust a charge current in the first region of interest during the subsequent charging of the battery, wherein each of the first and second charge profiles define a relationship between a state of charge and a swelling of the battery; and
   adjust a charge current during a subsequent charging of the battery.

16. The system of claim 15, wherein the first charge profile is defined by the first set of data comprising charge value data and swelling value data, wherein the subsequent charge profile is defined by a second set of data comprising charge value data and swelling value data.

17. The system of claim 15, wherein the first region of interest is determined based on swelling value data of the first set of data deviating more than a threshold from swelling value data of the second set of data at corresponding charge value data of the first and second sets.

* * * * *